(12) United States Patent
Batarseh

(10) Patent No.: US 11,299,950 B2
(45) Date of Patent: Apr. 12, 2022

(54) EXPENDED LASER TOOL

(71) Applicant: Saudi Arabian Oil Company, Dhahran (SA)

(72) Inventor: Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 12 days.

(21) Appl. No.: 16/801,465

(22) Filed: Feb. 26, 2020

(65) Prior Publication Data
US 2021/0262306 A1   Aug. 26, 2021

(51) Int. Cl.
| E21B 7/15 | (2006.01) |
|---|---|
| E21B 31/00 | (2006.01) |
| B23K 26/064 | (2014.01) |
| B08B 7/00 | (2006.01) |
| B08B 9/027 | (2006.01) |
| B23K 26/08 | (2014.01) |
| B23K 26/36 | (2014.01) |
| E21B 7/14 | (2006.01) |
| E21B 12/00 | (2006.01) |
| E21B 29/00 | (2006.01) |
| G02B 1/11 | (2015.01) |
| G02B 6/42 | (2006.01) |

(Continued)

(52) U.S. Cl.
CPC .......... *E21B 31/002* (2013.01); *B08B 7/0042* (2013.01); *B08B 9/027* (2013.01); *B23K 26/064* (2015.10); *B23K 26/0884* (2013.01); *B23K 26/36* (2013.01); *E21B 7/14* (2013.01); *E21B 7/15* (2013.01); *E21B 12/00* (2013.01); *E21B 29/002* (2013.01); *G02B 1/11* (2013.01); *G02B 6/4204* (2013.01); *G02B 27/0927* (2013.01); *G02B 27/0955* (2013.01); *H01S 3/0623* (2013.01); *H01S 3/06716* (2013.01); *H01S 3/1618* (2013.01); *E21B 37/00* (2013.01)

(58) Field of Classification Search
CPC .................................... E21B 7/14; E21B 7/15
See application file for complete search history.

(56) References Cited

U.S. PATENT DOCUMENTS

| 6,755,262 B2 | 6/2004 | Parker |
|---|---|---|
| 6,888,097 B2 | 5/2005 | Batarseh |

(Continued)

FOREIGN PATENT DOCUMENTS

| CN | 203081295 U | 7/2013 |
|---|---|---|
| CN | 203334954 U | 12/2013 |
| WO | WO-2013/019959 A2 | 2/2013 |

OTHER PUBLICATIONS

International Search Report for PCT/IB2020/053558, 4 pages (dated Nov. 30, 2020).

(Continued)

*Primary Examiner* — Giovanna Wright
(74) *Attorney, Agent, or Firm* — Choate, Hall & Stewart LLP; Charles E. Lyon; Peter A. Flynn

(57) ABSTRACT

A laser tool apparatus includes a tool body; a fiber optic cable disposed in the tool body, the fiber optic cable including a laser head that emits a laser beam; a reshape optic disposed coaxially downstream of the fiber optic, the reshape optic reshaping the laser beam emitted from the laser head; and a flexible cable attached to the reshape optic. The flexible cable flexibly orients the laser beam at a desired angle within a borehole.

20 Claims, 12 Drawing Sheets

(51) Int. Cl.
*G02B 27/09* (2006.01)
*H01S 3/06* (2006.01)
*H01S 3/067* (2006.01)
*H01S 3/16* (2006.01)
*E21B 37/00* (2006.01)

(56) References Cited

U.S. PATENT DOCUMENTS

| | | | |
|---|---|---|---|
| 8,307,900 | B2 | 11/2012 | Lynde et al. |
| 9,492,885 | B2 | 11/2016 | Zediker et al. |
| 9,512,679 | B2 | 12/2016 | Rinzler et al. |
| 10,323,460 | B2 | 6/2019 | Faircloth et al. |
| 2004/0256103 | A1* | 12/2004 | Batarseh ............ B23K 26/382 166/297 |
| 2005/0269132 | A1* | 12/2005 | Batarseh ............ B23K 26/032 175/40 |
| 2010/0044103 | A1 | 2/2010 | Moxley et al. |
| 2010/0326659 | A1 | 12/2010 | Schultz et al. |
| 2014/0360778 | A1 | 12/2014 | Batarseh |
| 2019/0309576 | A1 | 10/2019 | Faircloth et al. |

OTHER PUBLICATIONS

Written Opinion for PCT/IB2020/053558, 8 pages (dated Nov. 30, 2020).

* cited by examiner

EXPENDED LASER TOOL

FIELD

The subject matter described herein relates to apparatuses and systems for using a flexible laser cable to remove obstacles and objects from a borehole.

BACKGROUND

Laser technology has been implemented in the oil and gas industry for several years due to the unique properties of lasers such as precision, reliability, control, and cost. Many applications have been identified for high-power laser technology, including sensing, drilling, completions, and workover.

Scale includes deposits of inorganic materials that coat metal pipes, junk metal, hand tools, lengths of drill pipe, drill collars, directional drilling packages, and other objects. Scale may be caused by a chemical reaction, a change in pressure or temperature, or a change in composition of a solution within a borehole. A build-up of scale may decrease the flow of fluid through a borehole or may completely block the flow of fluid. This may be problematic, particularly in cases where the objects are located underground and, therefore, are not easily accessible. Accessing hard-to-reach target locations using conventional mechanical milling may be difficult.

Laser tools often have beams emitted from the center or from the side of the tool, and the beams travel in straight lines. In some situations, where the beams need to be at the edge of the borehole to be parallel to the borehole wall and at very close distance so they can remove materials at the wall, the tool body may restrict the beams due to the configuration of the tool. This applies to applications where the laser head is inserted inside restricted boreholes.

In drilling and workover operations, pipes, downhole tools, or other objects may get stuck in the wellbore for a number of reasons, including buckling in the casing and tools dropping into holes. Conventional laser heads may emit the laser beam at the center of the tool and are unable to deliver the beam at the sharp angles needed to reach and cut stuck objects out so that they can be removed. As a result, there may be no current laser based tool for performing fishing operations in these situations.

SUMMARY OF THE INVENTION

The present disclosed embodiments include apparatuses and systems for using high power lasers for critical areas that are restricted due to the shape, size, and location of the target zone. The present disclosed embodiments may be used to extend the beam to access any point in the borehole, parallel to the borehole or at an angle. The tool may be standalone to remove a stuck object or can be integrated with a fishing tool. The tool may also be used for other applications such as descaling, cleanup, condensate, and tar removal in critical areas that are restricted due to the shape, size, and location of the target zone. The tool may be used for applications including fishing out a stuck tool that may be stuck due to scale, descaling and removal of material at the surface of the pipe, reaching hard-to-reach areas and delivering the laser beam to them, trimming the wellbore, and cleaning up the wellbore. The tool may include a flexible cable to carry fiber optics to reach remote and inaccessible areas. The present disclosed embodiments allow the beam to extend at different locations and reach hard-to-reach targets. The present disclosed embodiments may include a fiber laser (for example, an ytterbium fiber laser) and a fiber optics delivery system. The fiber optics delivery system may include a laser tool to deliver a laser beam via the fiber optics. The laser tool may be flexible and bent using the flexible cable. The flexible cable may include fiber optics. The present disclosed embodiments may include apparatuses and systems that use high power laser technology to cut the stuck pipes and remove objects near the surface or subsurface.

In one aspect, the present invention is directed to a laser tool apparatus including: a tool body; a fiber optic cable disposed in the tool body, the fiber optic cable including a laser head that emits a laser beam; a reshape optic disposed coaxially downstream of the fiber optic, the reshape optic reshaping the laser beam emitted from the laser head; and a flexible cable attached to the reshape optic, where the flexible cable flexibly orients the laser beam at a desired angle within a borehole.

In some embodiments, the laser beam removes an obstacle within the borehole and cuts an object free during a fishing operation.

In some embodiments, the laser head further includes an anti-reflection surface coating.

In some embodiments, the reshape optic further includes an anti-reflection surface coating.

In some embodiments, the reshape optic includes a cylindrical body and a cone-shaped top portion, where the cone-shaped top portion receives the laser beam from the fiber optic cable.

In some embodiments, the reshape optic further includes a group of lenses and a purging nozzle.

In some embodiments, the group of lenses adjusts the size of the laser beam emitted from the laser head.

In some embodiments, the apparatus further includes a camera.

In some embodiments, the camera includes an optical camera.

In some embodiments, the camera includes an acoustic camera.

In some embodiments, the apparatus further includes a nozzle for coaxial purging attached to the end of the flexible cable, the nozzle including a nozzle tip. The nozzle tip increases a purging flow and prevents debris from flowing back towards the flexible cable.

In some embodiments, the apparatus further includes a mounting system for holding the laser head and the reshape optic.

In some embodiments, the mounting system includes a rotational stage integrated into the tool body, the rotational stage enabling a rotational circular motion of the flexible cable.

In some embodiments, the mounting system includes a telescoping axial stage, the telescoping axial stage adjusting an axial height of the reshape optic within the borehole.

In some embodiments, the apparatus further includes a splitter operatively coupled to the reshape optic, the splitter splitting the laser beam from the reshape optic and delivering the resulting laser beams to a plurality of flexible cables coupled downstream of the splitter.

In some embodiments, the apparatus further includes a drill bit, and the apparatus performs drilling and fishing.

In another aspect, the present invention is directed to a fiber optics delivery system including: a fiber optic tool body; a reshape optic; at least one flexible cable attached to the reshape optic; and a control system. The control system orients the flexible cable at a desired direction within a borehole.

In some embodiments, the reshape optic is disposed downstream of the fiber optic tool body. The reshape optic and the fiber optic tool body are connected to a mounting system.

In some embodiments, the fiber optic tool body includes a fiber optic cable, the fiber optic cable including a laser head to deliver a laser beam to the reshape optic.

In some embodiments, the laser head operates at a power from about one (1) kW to about ten (10) kW.

Throughout the description, where an apparatus, systems or embodiments are described as having, including, or comprising specific components, or where methods are described as having, including, or comprising specific steps, it is contemplated that, additionally, there are systems, apparatuses or embodiments of the present invention that consist essentially of, or consist of, the recited components, and that there are methods according to the present invention that consist essentially of, or consist of, the recited processing steps.

It should be understood that the order of steps or order for performing certain action is immaterial as long as the invention remains operable. Moreover, two or more steps or actions may be conducted simultaneously.

The following description is for illustration and exemplification of the disclosure only, and is not intended to limit the invention to the specific embodiments described.

The mention herein of any publication, for example, in the Background section, is not an admission that the publication serves as prior art with respect to any of the present claims. The Background section is presented for purposes of clarity and is not meant as a description of prior art with respect to any claim.

BRIEF DESCRIPTION OF THE DRAWINGS

A full and enabling disclosure of the present disclosed embodiments, including the best mode thereof, directed to one of ordinary skill in the art, is set forth in the specification, which makes reference to the appended figures, in which.

DESCRIPTION OF CERTAIN EMBODIMENTS OF THE INVENTION

Figure 1:
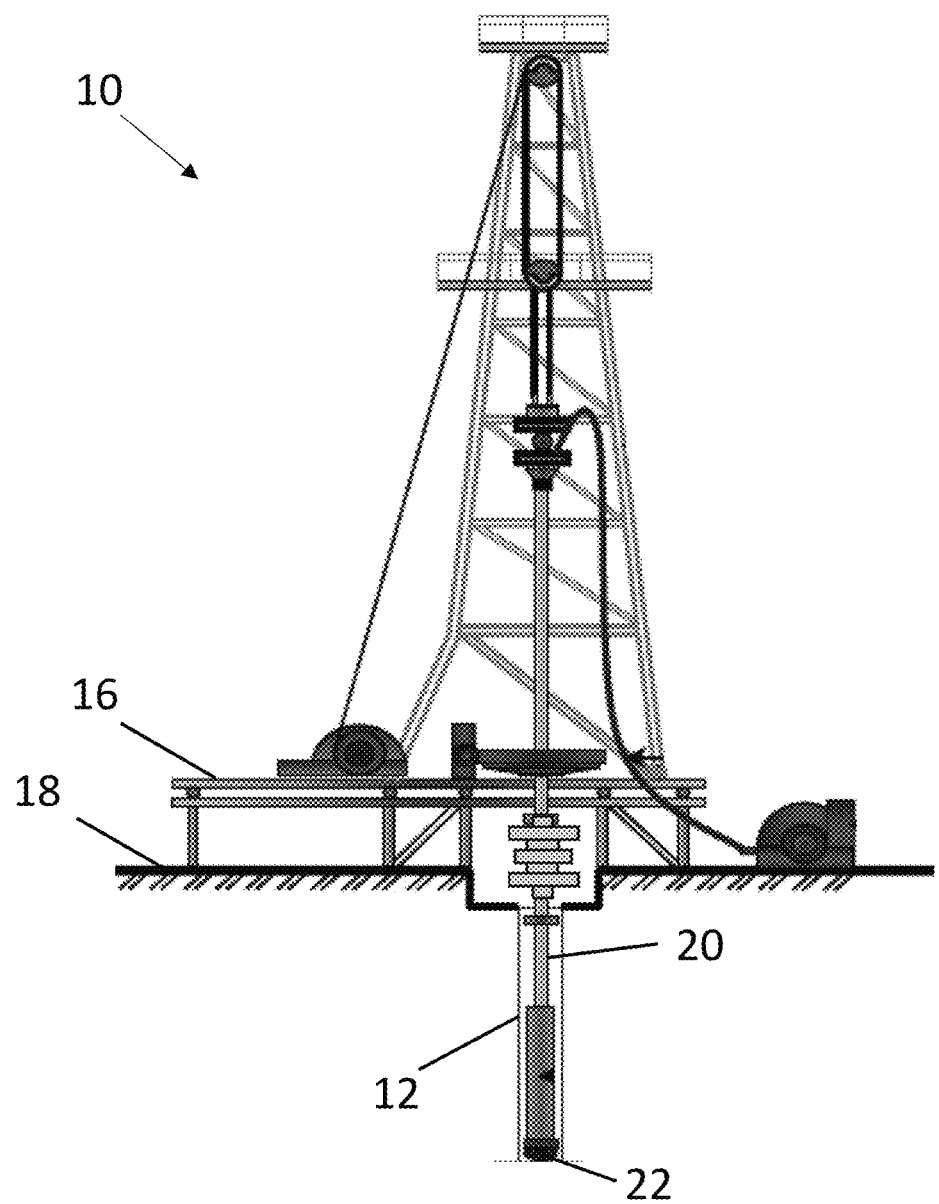
FIG. 1 illustrates a side view of an exemplary wellbore or borehole with a drill bit.

Reference will now be made in detail to the present disclosed embodiments, one or more examples of which are illustrated in the accompanying drawings. The detailed description uses numerical and/or letter designations to refer to features in the drawings. Like or similar designations in the drawings and description have been used to refer to like or similar parts of the present embodiments.

The present embodiments are directed to improved apparatuses and systems for subsurface applications that require the laser beam to reach target locations within a borehole, including, for example, the edge of a stuck pipe, allowing parallel beams to reach the target. The present embodiments help prevent the laser beam from contacting the surface of the borehole, in order to cut and remove inaccessible objects. Currently available tools deliver the beam from the center of or from the side of the tool, which makes it difficult for the beam to reach certain areas, as the tool body may be an obstacle and may not allow the beam to travel parallel to the wall of the borehole. The proposed tool allows the beam to be delivered to inaccessible targets by using flexible cables or nozzles that contain the fiber optics to deliver the laser beam to the target, which may also be used for fishing operations and other applications.

Figure 2:
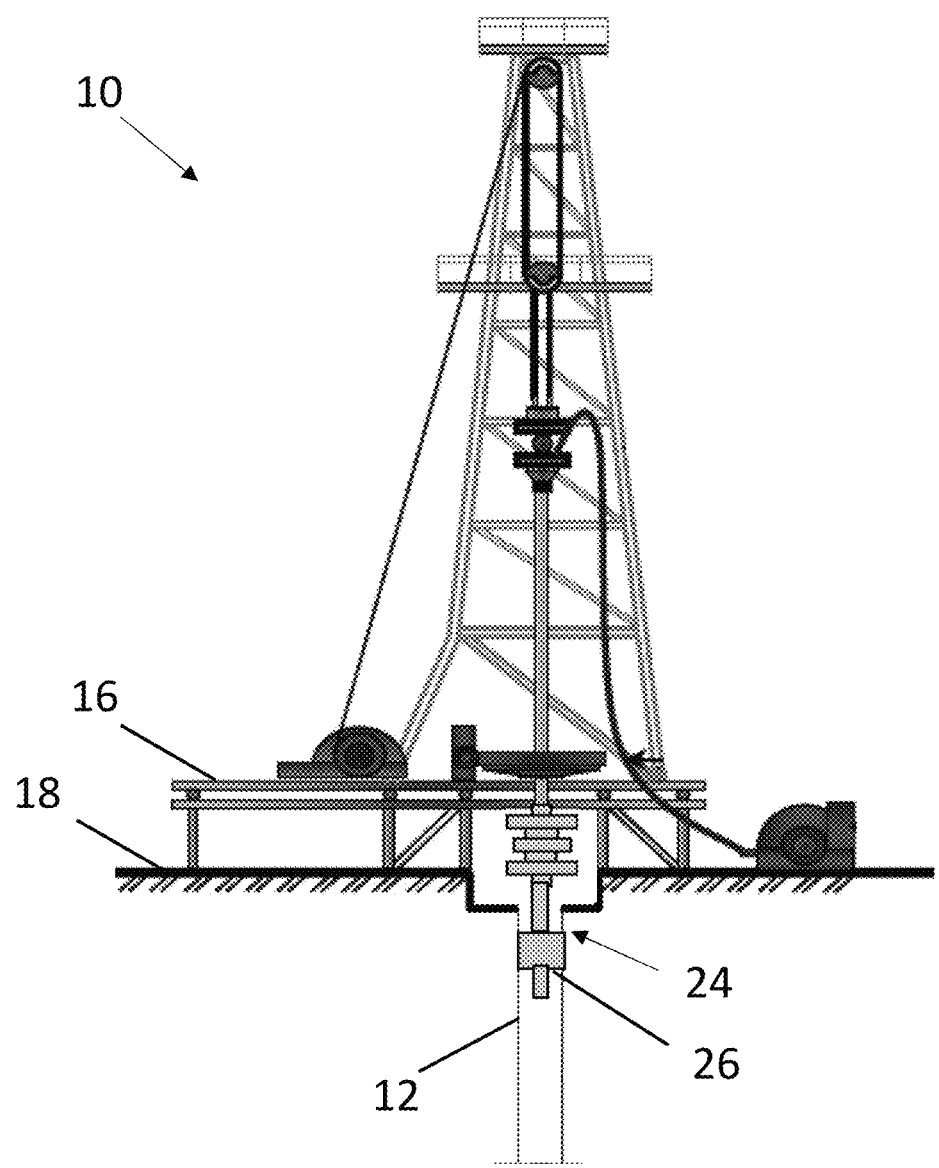
FIG. 2 illustrates a side view of an exemplary wellbore or borehole with a laser tool.

FIGS. 1-2 illustrate a side view of a borehole 12 formed by using an oil rig 10. The oil rig 10 may include a rig floor 16. Work crew may work primarily on a rig floor 16 above ground 18. In the embodiment of FIG. 1, work crew may drill in the borehole 12 using a drill pipe 20. The drill pipe 20 may include a drill bit 22. In the embodiment of FIG. 2, work crew may use a laser tool 24. The laser tool 24 may include a laser head 26. In another embodiment, the work crew may drill and use the laser tool 24 (for example, for in-situ fishing operations) at the same time.

Figure 3:
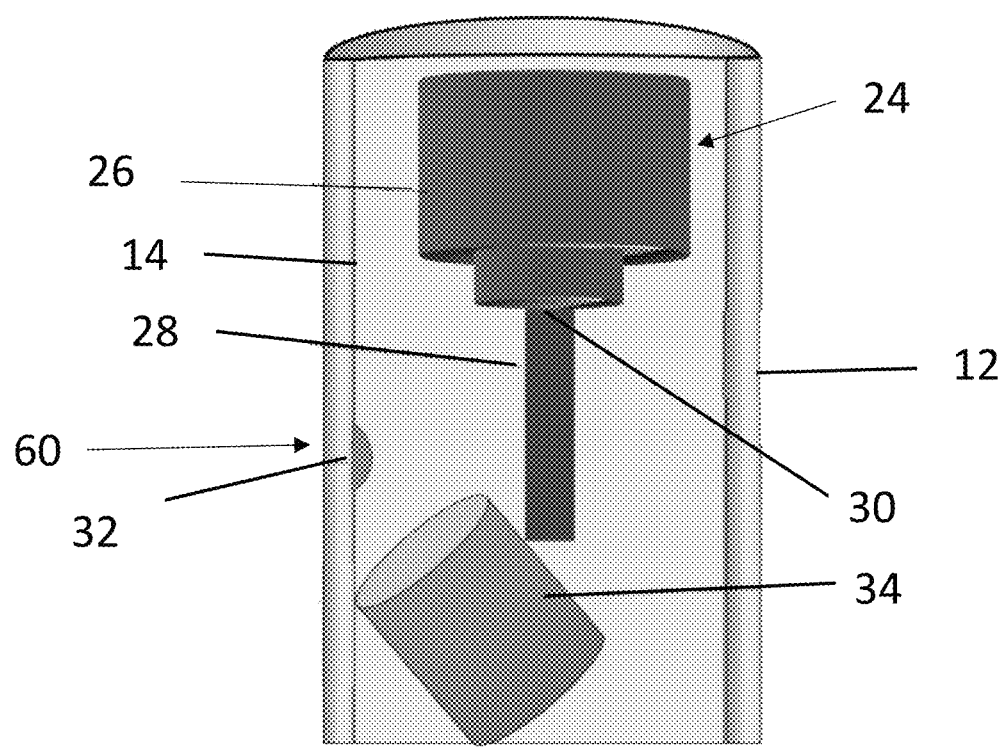
FIG. 3 illustrates a side view of an exemplary laser tool.

FIG. 3 illustrates a side view of an exemplary laser tool. The laser tool 24 may include the laser head 26 inserted in the borehole 12. The borehole 12 may be disposed at a ground surface, or within a subsurface. The laser head 26 may emit a laser beam 28 from a tool center 30. This configuration may not allow the beam to interact with a target area 60, for example, an obstacle 32 (for example scale) or an object 34 (for example the entirety of a stuck pipe). In one embodiment, to interact with the target area (for example, scale or a portion of a stuck pipe) at a borehole wall 14, the laser beam 28 must be parallel to the borehole 12 and would need to be very close to the borehole wall 14. These limitations make it difficult to remove accumulated scale and fishing stuck pipes using current exemplary laser tools.

Figure 4:
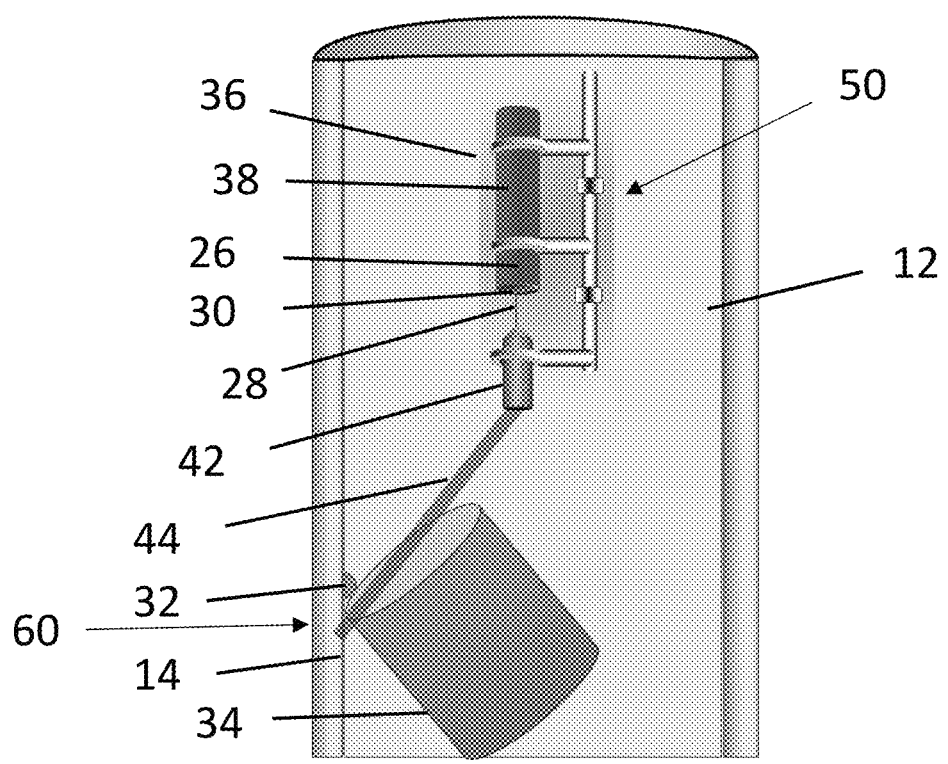
FIG. 4 illustrates a side view of a laser tool, according to aspects of the present embodiments.
Figure 5:
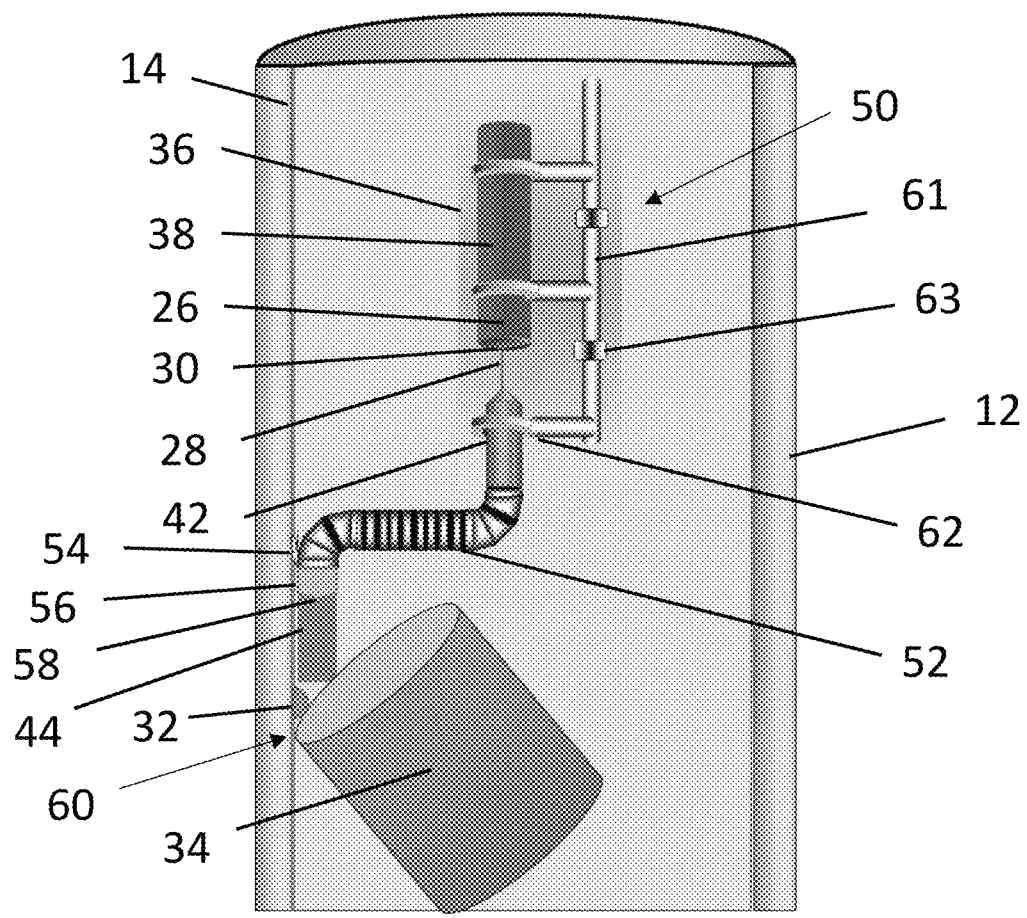
FIG. 5 illustrates a side view of the laser tool, according to aspects of the present embodiments.

FIG. 4 illustrates a side view of a laser tool 50, according to aspects of the present embodiments. In the embodiment of FIG. 4, the laser tool 50 may be used in applications where pipes or downhole tools get stuck in the wellbore 12. The laser tool 50 may include a tool body 36 that includes a fiber optic cable 38 to transmit the beam 28. The laser beam 28 may be emitted from the laser head 26 at a bottom end of the fiber optic cable 38, and may enter a reshape optic 42. The reshape optic 42 may be disposed coaxially downstream of the laser head 26 within the borehole 12. The reshape optic 42 may reshape the laser beam 28 emitted from the laser head 26 to expand or narrow the laser beam 28, and direct an output laser beam 44 at the target area 60, for example to a tool, pipe, or other object 34 that is stuck in the borehole 12 due to the presence of obstacles 32 and other factors. While providing better access to hard-to-reach targets, the output laser beam 44 may be oriented at an angle (not shown) to the target area 60, and the laser beam 44 may therefore reach a limited portion of the target area 60 due to the angle. The output laser beam 44 may also generate heat which may affect the stuck tool, pipe or other object 34. To overcome this issue, and based on the beam delivery system, an extended beam delivery is presented where an improved laser tool 50 that has a flexible fiber optic cable 52 that may be selectively oriented at the edge of the laser tool 50, thereby emitting the output laser beam 44 parallel to target the stuck tool, pipe or other object 34 or the scale 32, as illustrated in FIG. 5.

FIGS. 5-9 illustrate a side view of the laser tool 50, according to aspects of the present embodiments. The laser tool 50 may include the tool body 36 and the fiber optic cable 38 to host the laser beam 28. The laser beam 28 may exit from the laser head 26 of the fiber optic cable 38 into the reshape optic 42 which reshapes the laser beam 28. The reshape optic 42 may be disposed coaxially downstream of the laser head 26 within the borehole 12. Both the reshape optic 42 and the laser head 26 may include surface films or coatings (not shown) to reduce the heating and energy loss. The coating materials may include anti-reflection coatings such as magnesium fluoride, calcium fluoride, silicon dioxide and other suitable coatings. The form of the anti-reflection coating materials may be single layer or multiple-layer. The reshape optic 42 may be generally cylindrical with a cone-shaped top portion 65 where the laser beam 28 may be received. The reshape optic 42 may operatively communicate with the laser beam 28 into a flexible cable 52. The flexible cable 52 may move to point the laser beam 28 in any direction. The flexible cable 52 may move in any direction by, for example, electrical, mechanical, or hydraulic means. One end of the flexible cable 52 may be attached to the reshape optic 42, and the other end of the flexible cable 52 may be attached to a nozzle 56 for coaxial purging. The nozzle 56 may include a nozzle tip 58 that is narrower than the nozzle 56 so that the velocity of the purging flow increases to prevent debris from flowing back towards or into the flexible cable 52. The flexible cable 52 may include a camera 54 to image the borehole 12 as well as a target area 60. The camera 54 may be optical, or acoustic, or both optical and acoustic. In applications in which clear fluids or gases are present in the borehole 12, an optical camera 54 may be used. An acoustic camera 54 may be used if the borehole 12 includes unclear fluids. Acoustic cameras rely on sound travel through solids, fluids, and gases and can therefore function better in unclear and muddy environments where optical cameras may not function as desired. The flexible cable 52 may be integrated with a fishing tool (not shown) for fishing operations.

Referring still to FIGS. 5-9, the flexible cable 52 may be controlled from the surface (or the ground) to reach the target area 60. The tool, pipe or other object 34 may be stuck due to an obstacle 32 (for example scale). The flexible cable 52 may be controlled hydraulically, mechanically, or electrically, and may include an articulating arm. The flexible cable 52 may be oriented at an angle suitable for emitting the laser beam 28 parallel to the borehole wall 14, and may start cutting or trimming the target area 60 to fish the object 34 out of the borehole 12.

Referring still to FIGS. 5-9, the laser tool 50 may include a mounting system 61 as a support structure. The mounting system 61 may include a rotational stage 62 and an axial stage 63. The rotational stage 62 may be integrated to the laser tool 50 so that the flexible cable 52 may be rotated for forming circular motion, thereby enabling circular cutting for scale removal in the wellbore 12. The axial stage 63 may be telescoping for adjusting an axial height or depth of the laser tool 50 within the borehole 12.

Referring still to FIGS. 5-9, the laser head 26 may receive and deliver the laser beam 28 from a laser source (not shown). The laser head 26 may house an optical assembly (not shown) that includes optical components, such as lenses, to direct, shape, and size the laser beam 28. The laser head 26 and the reshape optic 42 are assembled at the surface and screwed to the main laser tool 50 or the fiber optic cable 38 using any suitable mechanism (for example, compression fit, clamp, pipe threads, adhesion, fitting et cetera). When the wellbore is filled with unclear fluids, the laser beam 28 may not be able to operate as intended. Depending on the fluid, some wavelengths may pass through the fluid with minimal loss. In the presence of unclear fluids, coaxial purging media may be used to clear the path for the laser beam 28. The coaxial purging media may include steam, nitrogen, carbon dioxide, water, fuel gas, or other suitable media.

In one embodiment, according to the present disclosure, the laser may include a power range from about 1 kW to about 10 kW, or from about 2 kW to about 10 kW, or from about 2 kW to about 8 kW, or from about 3 kW to about 6 kW. In another embodiment, according to the present disclosure, the laser may include a fixed voltage (for example, 3 phase 480 volts 50/60 Hz). In another embodiment, according to the present disclosure, the laser may include an operating frequency range up to about 5 kHz, or from about 1 kHz to about 5 kHz, or from about 2 kHz to about 4 kHz. In another embodiment, according to the present disclosure, the laser may include a bandwidth range up to about 1070 nm, or from about 200 nm to about 800 nm, or from about 400 nm to about 600 nm. In another embodiment, any laser with fiber optics delivery may be used. The laser tool 50 may use conventional control systems for adjusting the operation and function of the laser tool 50. A control panel may be at the surface or operated from a remote location. The power and communications link may be brought downhole to the laser and flexible cable via one or more wireline units with multiple wires.

Referring still to FIGS. 5-9, according to the present disclosure, the laser beam 28 in the reshape optic 42 may be operated with a fixed voltage. In another embodiment, the laser beam 28 in the reshape optic 42 may be operated with a fixed current. The power may be accommodated (for example, from about 1 kW to about 10 kW, or from about 2 kW to about 10 kW, or from about 2 kW to about 8 kW, or from about 3 kW to about 6 kW) depending on the application. The interior of the reshape optic 42 may be uniform with no hollows or contours, such that the energy may be distributed evenly within the reshaped laser beam 44.

Referring still to FIGS. 5-9, the flexible cable 52 may be covered by a protection from outside to have thermal and pressure resistance, and to withstand the downhole conditions of fluids, gases, and debris. The flexible cable 52 may include internally shielded fiber optics that house the laser beam 28, as transformed by the reshape optic 42. The external layer of the flexible cable 52 may include a plurality of mating links that may be shell-shaped or semi-spherical, each one being inserted into an adjacent link, and rotatable or articulable within an adjacent link. The outer structure of the flexible cable 52 may include metals, industrial plastics, such as thermoplastics, polyether ether ketone (PEEK), steals such as austenitic steels, carbon steels, galvanized steels, and other suitable materials.

Figure 6:
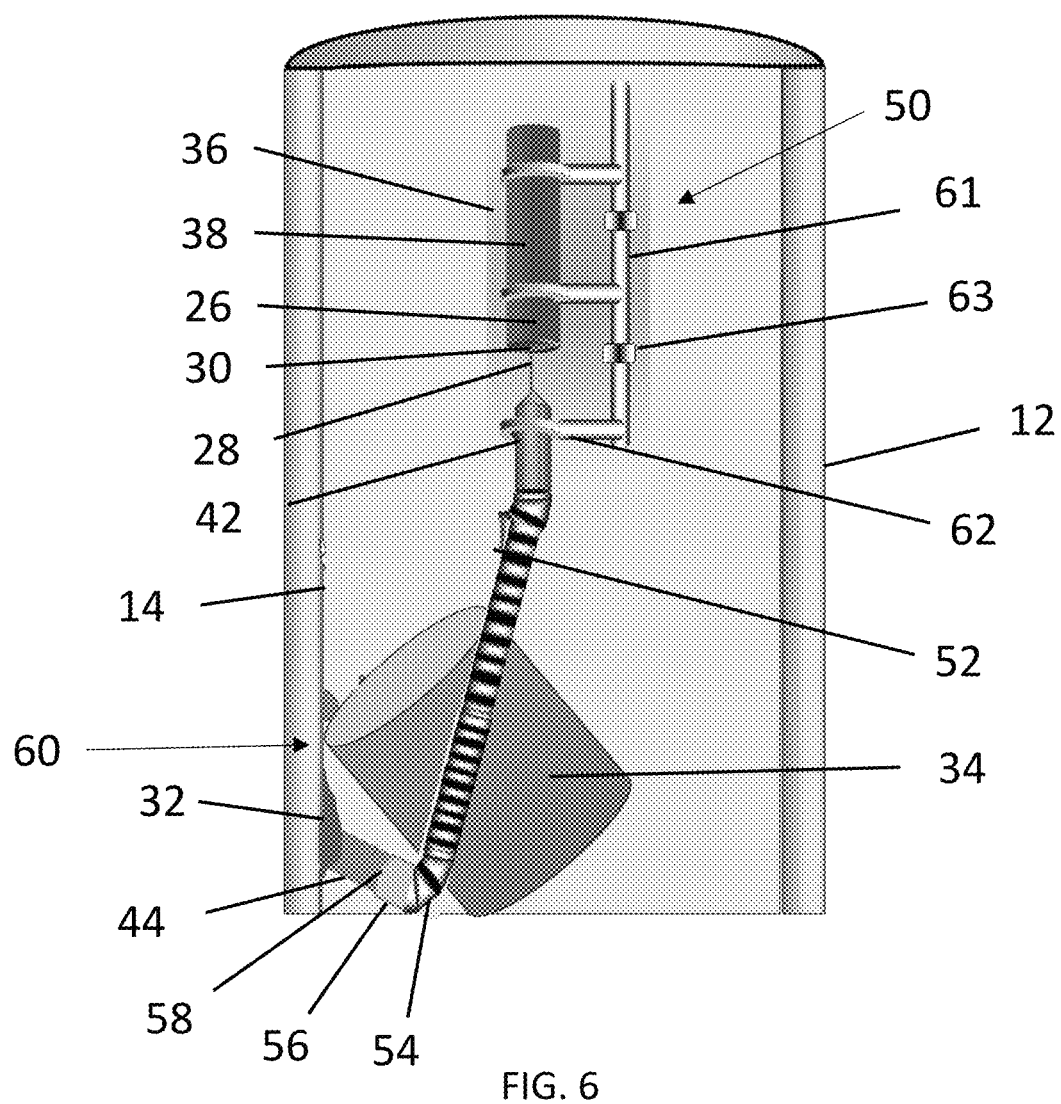
FIG. 6 illustrates a side view of the laser tool, according to aspects of the present embodiments.

Referring to FIGS. 5-6, the flexible cable 52 may remove the obstacle 32 at various areas. In the embodiment of FIG. 5, the obstacle 32 may be disposed at the borehole wall 14. The flexible cable 52 may be controlled hydraulically, mechanically, or electrically to direct the articulating arm at a suitable angle to emit the output laser beam 44 parallel to the borehole wall 14, and may start cutting or trimming the target area 60, and removing the scale or other obstacle 32. In the embodiment of FIG. 6, the obstacle 32 may be disposed at the borehole wall 14 within a target area 60. The obstacle 32 may be downstream of the object 34 (for example, a stuck pipe), and may be hard to reach. The flexible cable 52 may be controlled hydraulically, mechanically, or electrically so that the articulating arm of the flexible cable 52 may pass through the area around the object 34 within the borehole 12, and be directed at a suitable angle to emit the output laser beam 44 against the obstacle 32. The output laser beam 44 may start cutting or trimming the target area 60, removing the obstacle 32 (for example, scale). The articulating arm of the flexible cable 52 may twirl or wrap around the object 34 and fish the object 34 out of the borehole 12.

Figure 7:
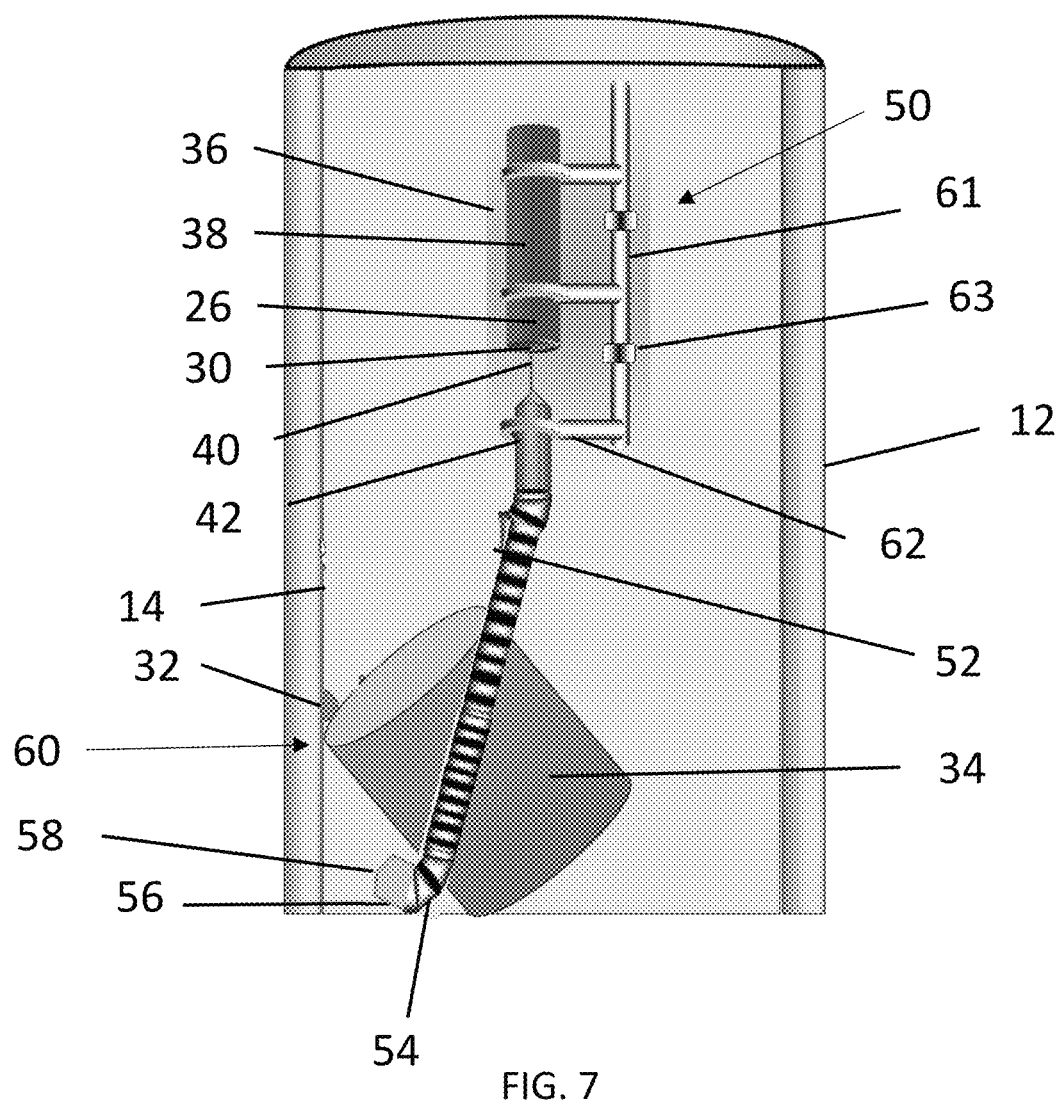
FIG. 7 illustrates a side view of the laser tool, according to aspects of the present embodiments.

Referring to FIG. 7, the obstacle 32 (for example, scale) may block the object 34 (for example, a stuck pipe) within the borehole 12. The object 34 may be stuck in the borehole 12. The flexible cable 52 may be controlled hydraulically, mechanically, or electrically so that the articulating arm of the flexible cable 52 that may be integrated with a fishing tool, may pass through the area around the object 34 within the borehole 12, twirl or wrap around the object 34, and fish the object 34 out of the borehole 12.

Figure 8:
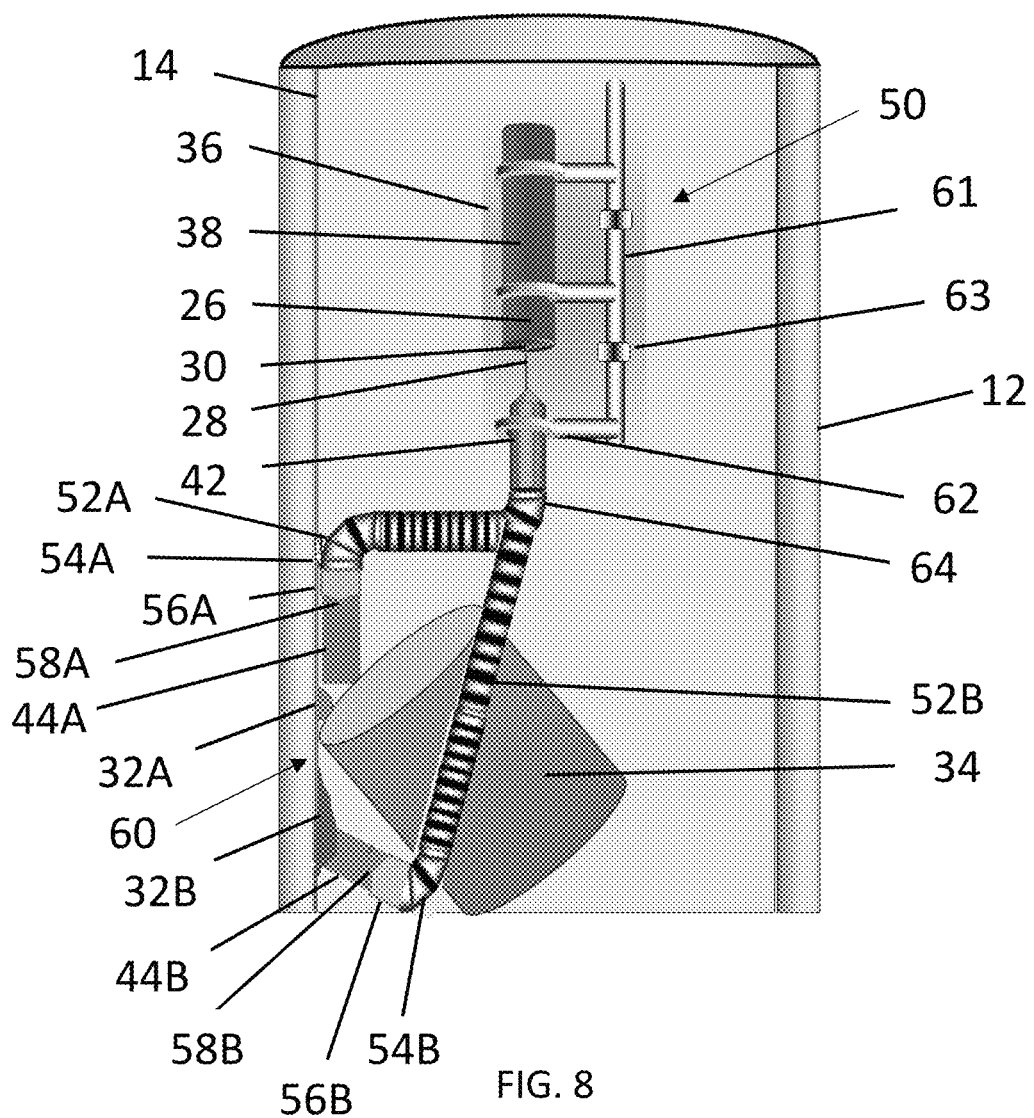
FIG. 8 illustrates a side view of the laser tool, according to aspects of the present embodiments.
Figure 9:
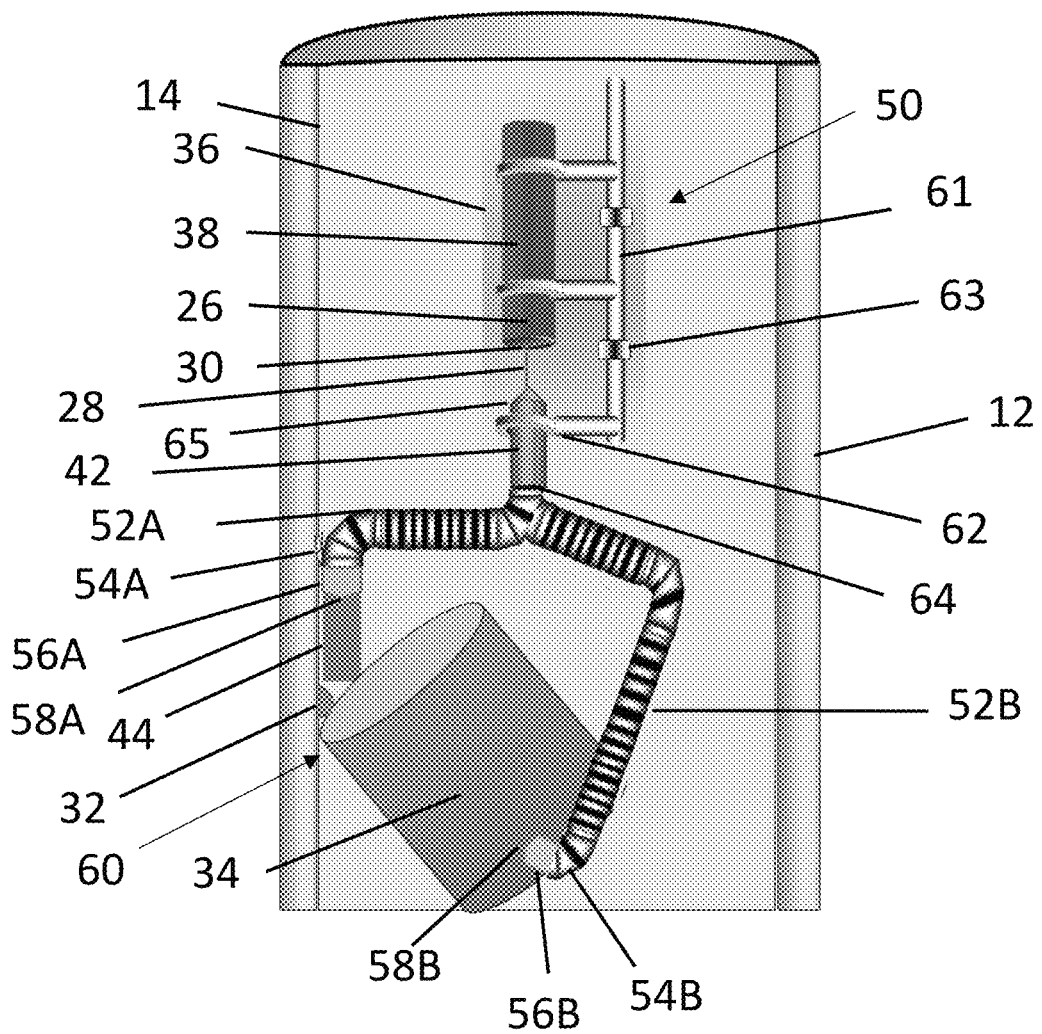
FIG. 9 illustrates a side view of the laser tool, according to aspects of the present embodiments.

Referring to FIGS. 8-9, the flexible cable 52 may include two or more flexible cables 52A, 52B. A splitter 64 may be disposed between the reshape optic 42 and the two or more flexible cables 52A, 52B in order to split the laser beam 28 into two or more bunches or beams (not shown) to enter the flexible cables 52A, 52B, respectively. The flexible cables 52A, 52B may include two or more cameras 54A, 54B in order to see the borehole 12 as well as the target area 60. The flexible cables 52A, 52B may include two or more nozzles 56A, 56B, as well as two or more nozzle tips 58A, 58B. The flexible cables 52A, 52B may be controlled hydraulically, mechanically, or electrically. In the embodiment of FIG. 8, the scale 32 may include two obstacles (for example, scaled areas) 32A, 32B disposed on the borehole wall 14 upstream and downstream of the object 34. The object 34 may be stuck between the two obstacles (for example, scaled areas) 32A, 32B. The first flexible cable 52A, disposed downstream of the splitter 64, may be controlled to direct the articulating arm at a suitable angle to emit the first output laser beam 44A parallel to the borehole wall 14, and may start cutting or trimming the target area 60 and removing the first obstacle 32A (for example, scale). The second flexible cable 52B, disposed downstream of the splitter 64, may be controlled to pass through the area around the object 34 within the borehole 12 such that it may be directed at a suitable angle to emit the second output laser beam 44B against the second obstacle 32B (for example, scale). The second output laser beam 44B may start cutting or trimming the target area 60, removing the second obstacle 32B (for example, scale). The articulating arm of the flexible cable 52A, or 52B, or both 52A and 52B may be integrated with a fishing tool, and may further pass through the area around the object 34 within the borehole 12, twirl or wrap around the object 34, and fish the object 34 out of the borehole 12.

In the embodiment of FIG. 9, the first flexible cable 52A, disposed downstream of the splitter 64, may be controlled to direct the articulating arm at a suitable angle to emit the output laser beam 44 parallel to the borehole wall 14, and may start cutting or trimming the target area 60 and removing the obstacle 32 (for example, scale). The second flexible cable 52B, disposed downstream of the splitter 64, may be controlled to pass through the area around the object 34 within the borehole 12, wrap around the object 34, and fish the object 34 out of the borehole 12. The two or more flexible cables 52A, 52B may perform both removal of the obstacle 32 and fishing operations by integrating fishing tools into the laser tool 50.

Figure 10:
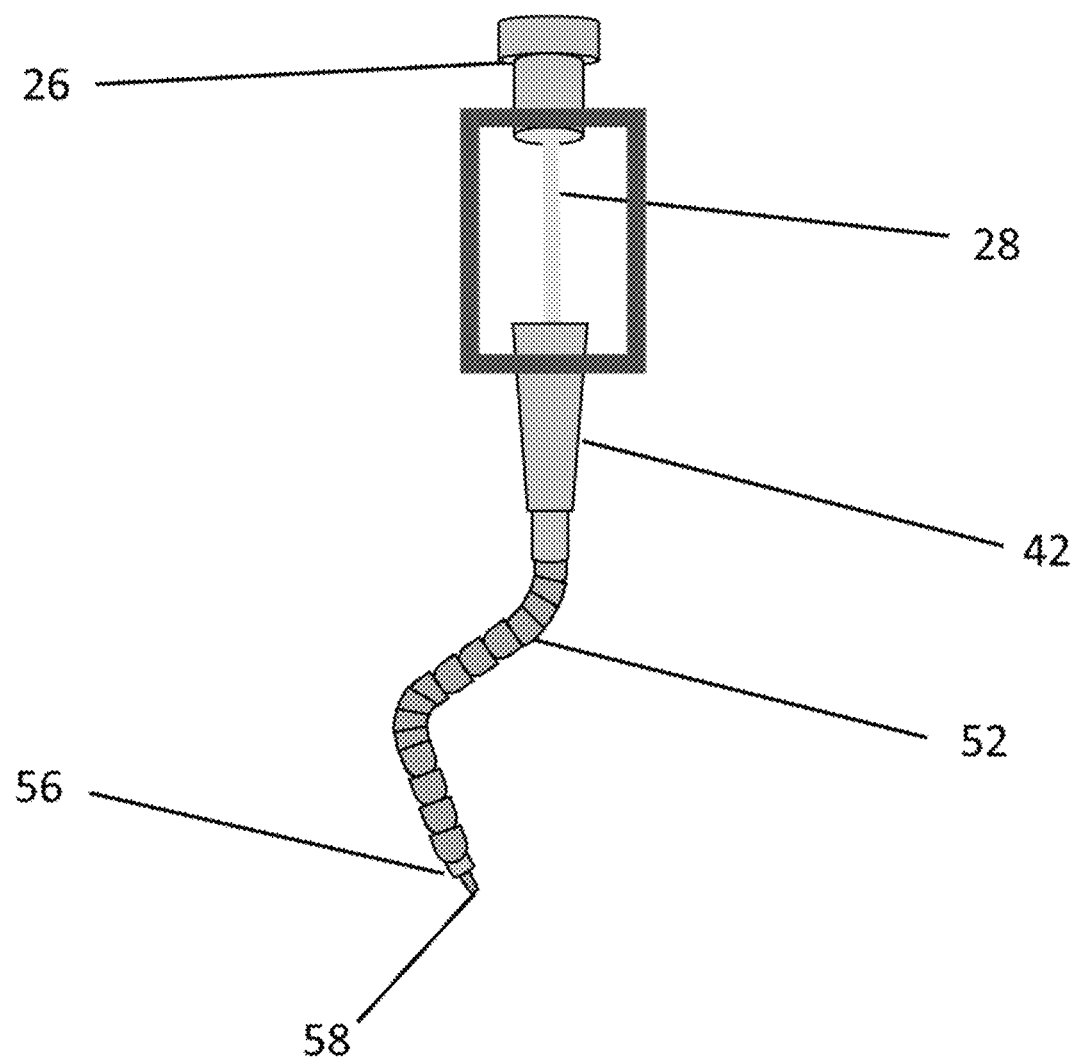
FIG. 10 illustrates a side view of an embodiment of the laser tool, according to aspects of the present embodiments.

FIG. 10 illustrates a side view of an embodiment of a laser tool 50, according to aspects of the present embodiments. The laser beam 28 may exit from the laser head 26 of the fiber optic cable 38 (shown in FIGS. 4-9) into the reshape optic 42 for reshaping. Both the reshape optic 42 and the laser head 26 may include surface films or coatings to reduce the heating and energy loss. The coating materials may include magnesium fluoride, calcium fluoride, silicon oxide, or other suitable single layer or multiple-layer anti-reflection coating materials. The reshape optic 42 may be generally cylindrical with a cone-shaped top portion 65 where the laser beam 28 is received. The reshape optic 42 operatively couples the laser beam 28 into the flexible cable 52. The flexible cable 52 may be attached to different heads and configurations. For example, the flexible cable 52 may be connected to a purging head 56 with a nozzle tip 58. The purging head 56 may have the nozzle tip 58 to improve a purging flow so the velocity of the purging flow is higher, thereby preventing the debris from flowing back towards the flexible cable 52.

Figure 11:
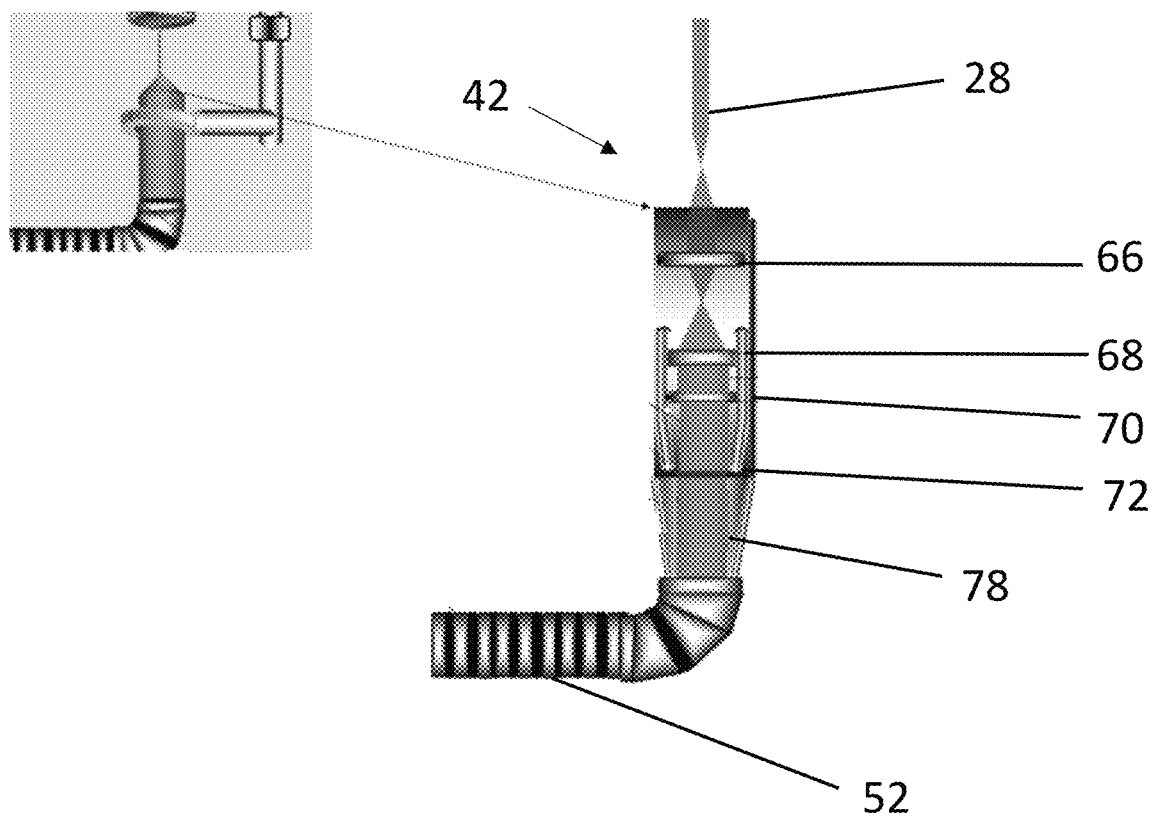
FIG. 11 illustrates a side view of an embodiment of a reshape optic, according to aspects of the present embodiments.

FIG. 11 illustrates a side view of an embodiment of the reshape optic 42, according to aspects of the present embodiments. The reshape optic 42 may include a first lens 66, a second lens 68, a third lens 70, and a purging nozzle 72. The second lens 68 may be longitudinally disposed between the first and third lenses 66, 70. In one embodiment, the first lens 66 may be a focus lens, and the second lens 68 may be a recollimation lens. In another embodiment, the first lens 66 may be a focus lens, and the second lens 68 may be also a focus lens for focusing to reshape the beam for focusing and defocusing.

Referring still to FIG. 11, the laser beam 28 that exits the laser head 26 of the fiber optic cable 38 and enters the reshape optic 42 may need to be reshaped and resized. The reshape optic 42 may be used to reshape the laser beam 28. The laser beam 28 may enter the lenses 66, 68, 70 disposed within the reshape optic 42, and may be characteristically reshaped (for example, in size, shape, frequency, and power) as it exits the reshape optic 42. The function of the reshape optic 42 may be to control the beam shape and size and to operatively couple the laser beam 28 to the flexible cable 52. The reshape optic 42 may include mainly optics, fused silica lenses, diamond optics and other optical components 78.

Figure 12:
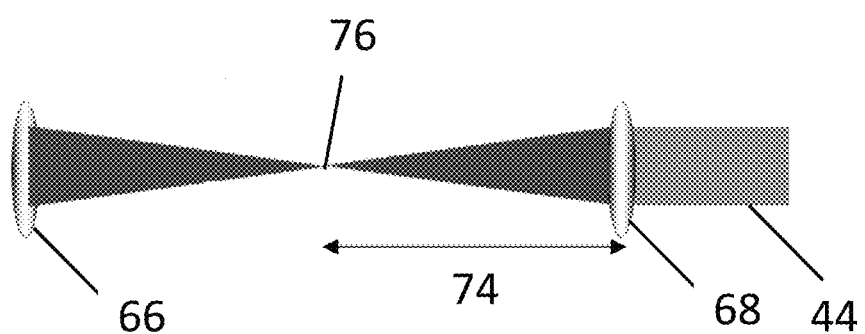
FIG. 12 illustrates an expanded side view of the reshape optic, according to aspects of the present embodiments.
Figure 13:
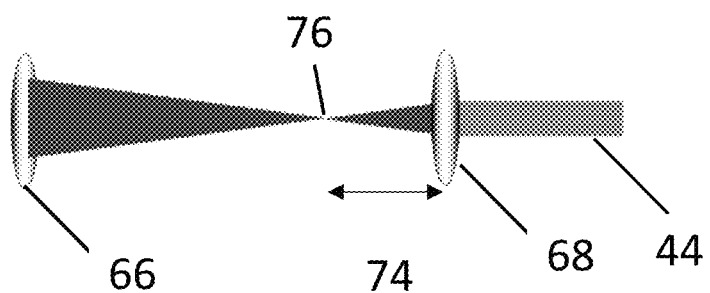
FIG. 13 illustrates an expanded side view of the reshape optic, according to aspects of the present embodiments.

FIGS. 12-13 illustrate an expanded side view of the reshape optic 42, according to aspects of the present embodiments. The reshape optic 42 may adjust the laser beam 28 thickness, focal length, or focus area by adjusting the distance between the first lens 66 and the second lens 68. By moving the second lens 68 closer to or farther from a focal point 76, a distance 74 between the second lens 68 and the focal point 76 may be selectively adjusted such that a desired size of the output laser beam 44 is achieved. In the embodiment of FIG. 12, the reshape optic 42 may adjust a distance 74 between the second lens 68 and the focal point 76 to expand the output laser beam 44. In the embodiment of FIG.

13, the reshape optic 42 may adjust a distance 74 between the second lens 68 and a focus point 76 to narrow the output laser beam 44.

After the obstacle 32 (for example, scale) is removed, the laser tool 50 may be extracted from the borehole 12 using a coiled tubing unit, a wireline, or a tractor. In cases where the laser tool 50 is operating downhole within a well, the laser tool may also be brought uphole. Other system components may be required to enable the functionality of this invention, and may include purging to clear the hole and cool the optics.

Examples of scale that may be removed using the laser tool 50 include calcite, aragonite, vaterite, anhydrite, gypsum, barite, celestite, mackinawite (iron sulfide), pyrite, halite, fluorite, sphalerite, and galena.

Examples of other objects from which the laser tool may remove scale include casings, tubing, valves, tubulars, drill pipes, pumps, downhole completion tools, sub-surface safety valves, screens, gravel packs, perforations, and other downhole components, equipment, and systems.

Other system configurations or arrangement of components are possible or desirable to allow the laser tool 50 to be selectively maneuvered and articulated.

All or part of the tools and processes described in this specification and their various modifications may be controlled at least in part by a control system comprised of one or more computing systems using one or more computer programs. Examples of computing systems include, either alone or in combination, one or more desktop computers, laptop computers, servers, server farms, and mobile computing devices such as smartphones, features phones, and tablet computers.

The laser tool 50 of the present embodiments may be a standalone tool to remove the stuck object, or may be integrated with a fishing tool. The laser tool 50 may be used for other applications such as descaling, clean up, trimming, condensate, and tar removal.

Elements of different implementations described may be combined to form other implementations not specifically set forth herein. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

These and other features, aspects and advantages of the present invention will become better understood with reference to the following description and appended claims. The accompanying drawings, which are incorporated in and constitute a part of this specification, illustrate embodiments of the present disclosure and, together with the description, serve to explain the principles of the present embodiments.

CERTAIN DEFINITIONS

In order for the present disclosure to be more readily understood, certain terms are first defined below. Additional definitions for the following terms and other terms are set forth throughout the specification.

An apparatus, system, or method described herein as "comprising" one or more named elements or steps is open-ended, meaning that the named elements or steps are essential, but other elements or steps may be added within the scope of the apparatus, system, or method. To avoid prolixity, it is also understood that any apparatus, system, or method described as "comprising" (or which "comprises") one or more named elements or steps also describes the corresponding, more limited apparatus system, or method "consisting essentially of" (or which "consists essentially of") the same named elements or steps, meaning that the apparatus, system, or method includes the named essential elements or steps and may also include additional elements or steps that do not materially affect the basic and novel characteristic(s) of the system, apparatus, or method. It is also understood that any apparatus, system, or method described herein as "comprising" or "consisting essentially of" one or more named elements or steps also describes the corresponding, more limited, and closed-ended apparatus, system, or method "consisting of" (or "consists of") the named elements or steps to the exclusion of any other unnamed element or step. In any apparatus, system, or method disclosed herein, known or disclosed equivalents of any named essential element or step may be substituted for that element or step.

As used herein, "borehole" or "wellbore" with reference to a claim feature means open-hole or uncased portion(s) of the well.

As used herein, "fish", "fishing", or "fishing operation" with reference to a claim feature means the application of tools, equipment and techniques for the removal of junk, debris or the attempt to retrieve an object left in a wellbore out of a wellbore.

As used herein, "a" or "an" with reference to a claim feature means "one or more," or "at least one."

As used herein, the term "substantially" refers to the qualitative condition of exhibiting total or near-total extent or degree of a characteristic or property of interest.

EQUIVALENTS

It is to be understood that while the disclosure has been described in conjunction with the detailed description thereof, the foregoing description is intended to illustrate and not limit the scope of the invention(s). Other aspects, advantages, and modifications are within the scope of the claims.

This written description uses examples to disclose the invention, including the best mode, and also to enable any person skilled in the art to practice the present embodiments, including making and using any devices or systems and performing any incorporated methods. The patentable scope of the present embodiments is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laser tool apparatus comprising:
    a tool body;
    a fiber optic cable disposed in the tool body, the fiber optic cable comprising a laser head that emits a laser beam;
    a reshape optic disposed coaxially downstream of the fiber optic, the reshape optic reshaping the laser beam emitted from the laser head; and
    a flexible cable attached to the reshape optic,
    where the flexible cable flexibly orients the laser beam at a desired angle within a borehole, and where the reshape optic comprises a cylindrical body and a cone-shaped top portion, where the cone-shaped top portion receives the laser beam from the fiber optic cable.

2. The apparatus of claim 1, where the laser beam is configured to remove an obstacle within the borehole, and where the laser beam is configured to cut an object free during a fishing operation.

3. The apparatus of claim 1, where at least one of the reshape optic and the laser head further comprises an anti-reflection surface coating.

4. The apparatus of claim 1, further comprising at least one of an acoustic camera and an optical camera.

5. The apparatus of claim 1, further comprising a nozzle for coaxial purging attached to the end of the flexible cable, the nozzle comprising a nozzle tip, the nozzle tip increasing a purging flow and preventing debris from flowing back towards the flexible cable.

6. The apparatus of claim 1, further comprising a mounting system for holding the laser head and the reshape optic.

7. The apparatus of claim 6, where the mounting system comprises a rotational stage integrated into the tool body, where the rotational stage enables a rotational circular motion of the flexible cable.

8. The apparatus of claim 7, where the mounting system comprises a telescoping axial stage, where the telescoping axial stage adjusts an axial height of the reshape optic within the borehole.

9. The apparatus of claim 1, further comprising a splitter operatively coupled to the reshape optic, the splitter splitting the laser beam from the reshape optic and delivering the resulting laser beams to a plurality of flexible cables coupled downstream of the splitter.

10. A fiber optics delivery system for use in a borehole comprising:
a fiber optic tool body;
a laser head operatively coupled to the fiber optic tool body;
a reshape optic disposed coaxially downstream of the laser head within the borehole;
at least one flexible cable attached to the reshape optic and comprising an external layer; and
a control system;
where the control system orients the flexible cable at a desired direction within the borehole, and
where the external layer comprises a plurality of mating shell-shaped links, each shell-shaped link inserted into and rotatable within an adjacent shell-shaped link.

11. The system of claim 10, where the reshape optic comprises a cylindrical body and a cone-shaped top portion, where the cone-shaped top portion receives the laser beam from the fiber optic cable.

12. The system of claim 11, where the reshape optic further comprises a group of lenses; and
a purging nozzle.

13. The system of claim 12, where the group of lenses adjusts the size of the laser beam emitted from the laser head.

14. The system of claim 10, where the reshape optic is disposed downstream of the fiber optic tool body, and where the reshape optic and the fiber optic tool body are connected to a mounting system.

15. The system of claim 10, where the fiber optic tool body comprises a fiber optic cable, the fiber optic cable comprising a laser head to deliver a laser beam to the reshape optic.

16. The system of claim 15, where the laser head operates at a power from about one (1) kW to about ten (10) kW.

17. The system of claim 10, where the external layer is composed at least partially of a polyether ether ketone (PEEK) material.

18. The system of claim 17, further comprising at least one of an optical camera and an acoustic camera.

19. The system of claim 18, where at least one of the reshape optic and the laser head further comprises an anti-reflection surface coating.

20. The system of claim 19, where the plurality of mating shell-shaped links forms an articulating arm comprising an internal shield around the fiber optics.

\* \* \* \* \*

UNITED STATES PATENT AND TRADEMARK OFFICE
CERTIFICATE OF CORRECTION

| | | |
|---|---|---|
| PATENT NO. | : 11,299,950 B2 | |
| APPLICATION NO. | : 16/801465 | |
| DATED | : April 12, 2022 | |
| INVENTOR(S) | : Sameeh Issa Batarseh | |

It is certified that error appears in the above-identified patent and that said Letters Patent is hereby corrected as shown below:

On the Title Page

Item (54) (title): change from "Expended Laser Tool" to "Extended Laser Tool"

In the Specification

At Column 1, Line number 1, change from "Expended Laser Tool" to "Extended Laser Tool"

Signed and Sealed this
Thirty-first Day of May, 2022

*Katherine Kelly Vidal*

Katherine Kelly Vidal
*Director of the United States Patent and Trademark Office*